(12) United States Patent
Masuda

(10) Patent No.: US 6,661,142 B2
(45) Date of Patent: Dec. 9, 2003

(54) MOTOR DEVICE WHEREIN ACCURATE SIZING IS POSSIBLE

(75) Inventor: Atsushi Masuda, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 21 days.

(21) Appl. No.: 10/038,072

(22) Filed: Jan. 4, 2002

(65) Prior Publication Data

US 2002/0057024 A1 May 16, 2002

Related U.S. Application Data

(63) Continuation of application No. 09/625,833, filed on Jul. 26, 2000.

(30) Foreign Application Priority Data

Jul. 28, 1999 (JP) .............................................. 11-213228

(51) Int. Cl.$^7$ .......................... H02K 7/00; H02K 11/00; H02K 5/16; H02K 7/08; H02K 3/00
(52) U.S. Cl. ........................ 310/90; 310/179; 310/254; 310/258; 310/67 R
(58) Field of Search ................................ 310/90, 67 R, 310/51, 323.05, 323.14, 323.17, 326, 235, 260, 210, 216, 42, 91, 254, 270, 179, 258

(56) References Cited

U.S. PATENT DOCUMENTS

| | | | |
|---|---|---|---|
| 3,356,425 A | * 12/1967 | Carriere ........................ 310/90 |
| 4,965,476 A | 10/1990 | Lin | |
| 5,227,686 A | 7/1993 | Ogawa | |
| 5,274,288 A | 12/1993 | Stefansky | |
| 5,334,895 A | 8/1994 | Morioka et al. | |
| 5,347,187 A | * 9/1994 | Tsuzaki et al. ....... 310/40 MM |
| 5,449,963 A | 9/1995 | Mok | |
| 5,459,361 A | * 10/1995 | Morioka .................... 310/67 R |
| 5,483,113 A | 1/1996 | Sakuragi et al. | |
| 5,598,047 A | * 1/1997 | Sakuragi et al. ............. 310/157 |
| 5,623,382 A | 4/1997 | Moritan et al. | |
| 5,654,597 A | 8/1997 | Sakashita et al. | |
| 5,723,927 A | 3/1998 | Teshima | |
| 5,821,647 A | 10/1998 | Takehara et al. | |
| RE36,086 E | 2/1999 | Hishida et al. | |
| 5,880,543 A | * 3/1999 | Park ....................... 310/156.26 |
| 5,883,453 A | * 3/1999 | Choi ........................... 310/90 |
| 6,097,121 A | * 8/2000 | Oku ........................... 310/258 |
| 6,232,690 B1 | 5/2001 | Schmider | |
| 6,242,830 B1 | 6/2001 | Katagiri | |
| 6,281,608 B1 | * 8/2001 | Matsushima .................. 310/51 |
| RE37,638 E | * 4/2002 | Cap et al. ..................... 310/42 |

* cited by examiner

Primary Examiner—Nestor Ramirez
Assistant Examiner—Julio C. Gonzalez
(74) Attorney, Agent, or Firm—Brinks Hofer Gilson & Lione

(57) ABSTRACT

A motor device, in which decentering during rotation of a disk can be prevented, is provided with a bearing unit including a cylindrical bearing and a flange formed integrally with each other, the upper face of the flange being perpendicular to a rotational shaft. Sizing is performed by using the upper face of the flange as a reference. A spacer made of resin and having the same shape as that of the flange is provided on the upper face of the flange. The spacer has an upper face inclined with respect to the upper face of the flange. A core unit is fixed inclined to the spacer on the upper face thereof, thereby tilting the rotational shaft, whereby the rotational shaft is urged toward one side of a coupling hole.

9 Claims, 6 Drawing Sheets

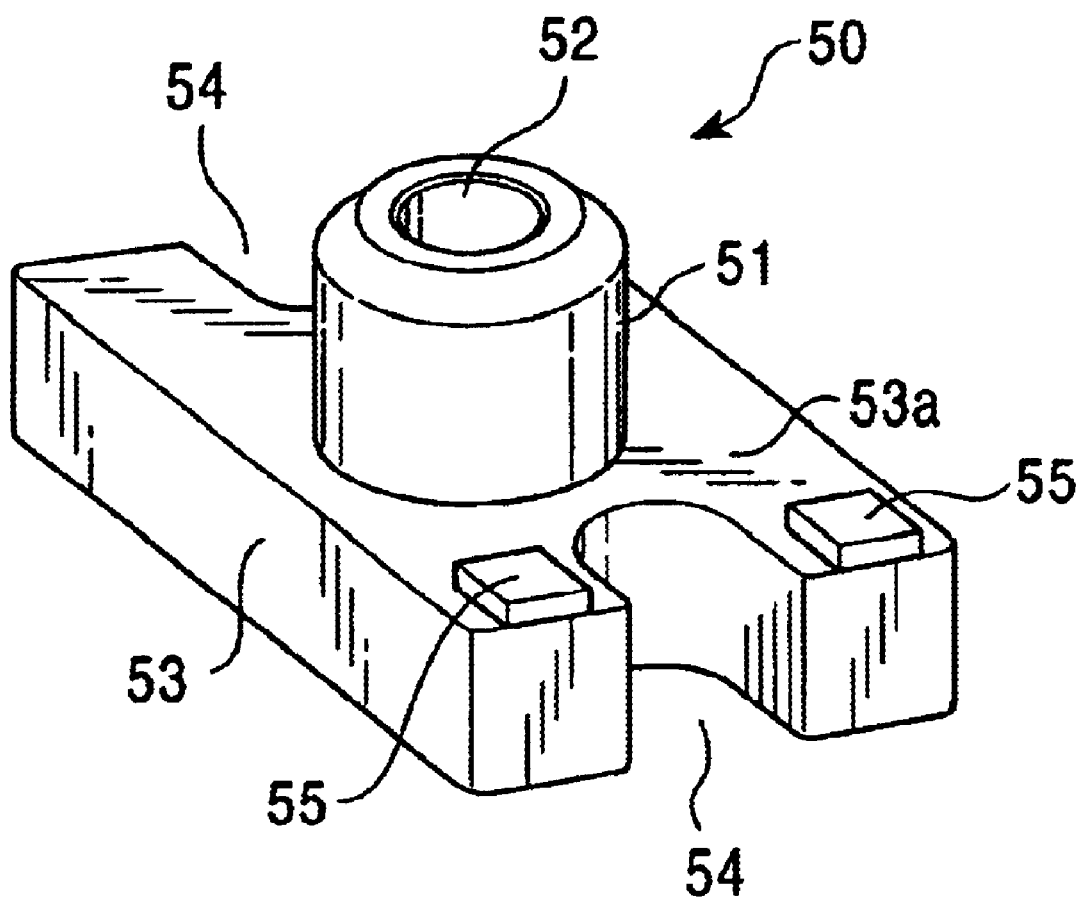

MOTOR DEVICE WHEREIN ACCURATE SIZING IS POSSIBLE

This application is a continuation application of U.S. application Ser. No. 09/625,833 filed on Jul. 26, 2000, entitled "MOTOR DEVICE WHEREIN ACCURATE SIZING IS POSSIBLE".

BACKGROUND OF THE INVENTION

1. Field of the Invention

The present invention relates to motor devices used in magnetic disk drives, and in particular, relates to a motor device in which decentering during disk rotation can be suppressed.

2. Description of the Related Art

FIG. 11 is a perspective view of a bearing unit 50 which is a component of a motor device to be mounted on a magnetic disk drive for a floppy disk (FD).

The bearing unit 50 includes a cylindrical bearing 51 and a flange 53 provided integrally with the periphery of the cylindrical bearing 51. The flange 53 is provided with U-shaped grooves 54 at the longitudinal ends of the flange 53 for positioning the bearing unit 50 on a mounting base. The flange 53 is also provided on an upper face 53a thereof with a pair of rectangular projections 55 at one of the longitudinal ends provided with the grooves 54 of the flange 53. The cylindrical bearing 51, the flange 53, and the projections 55 are integrally formed with each other by a method, such as by die-casting or sintering.

The bearing unit 50 receives a rotational shaft (not shown) in a coupling hole 52 of the cylindrical bearing 51. Thus, the rotational shaft is rotatably supported. The rotational shaft is provided with a rotor, fixed thereto, having a magnet, the rotor being rotatable integrally with the rotational shaft.

The bearing unit 50 is provided with a core unit fixed to the upper face 53a of the flange 53. The core unit is disposed inclined by being supported by a part of the upper face 53a and the projections 55 of the flange 53. The core unit is thus supported slightly inclined with respect to a plane perpendicular to the rotational axis.

When the core unit is fixed to be inclined on the bearing unit 50, decentering, or surface misalignment, that is, wow and flutter due to precession movements of the rotational shaft can be suppressed, whereby tracking errors due to off-tracking of a head from recording tracks on the disk can be avoided, the off-tracking being caused by the decentering.

However, a problem has been found in the above-described known motor device, which is described below.

During manufacturing, the above-described bearing unit 50 is proceeded in a sizing process in which the inner diameter of the coupling hole 52 is set by press-fitting a shaft or the like into the hole so as to obtain the accuracy in size. However, the sizing cannot be performed at a high accuracy when the projections 55 are formed on the upper face 53a of the flange 53, as shown in FIG. 11, because the sizing is performed with the upper face 53a of the flange 53 being as a reference, thereby producing decentering of the rotational shaft; therefore, high on-tracking accuracy cannot be ensured.

Moreover, the bearing unit 50 having a complex shape including the projections 55 is made of a specified material to be formed integrally with the flange 53, thereby increasing processing costs, whereby overall manufacturing cost is increased.

SUMMARY OF THE INVENTION

Accordingly, it is an object of the present invention to provide a motor device in which high sizing-accuracy is possible and which can be manufactured at a low cost.

To this end, according to a first aspect of the present invention, a motor device comprises a base, a bearing unit fixed to the base, a core unit including coils provided around cores to be fixed to the base side, a rotational shaft rotatably supported by the bearing unit, a rotor fixed to the rotational shaft, and a magnet fixed to the rotor and opposing the core unit. The bearing unit includes a flange extending along the base and a spacer disposed on the flange and having an inclined surface. The core unit is placed on the inclined surface of the spacer, whereby the core unit is disposed inclined with respect to an upper face of the base.

With this arrangement, sizing can be performed, before the spacer is placed on the flange and is fixed thereto, by using an upper surface of the flange as a reference, thereby enabling a highly accurate sizing.

According to the present invention, it is not necessary to integrally form a bearing unit of a specified metallic material, which has a complex shape by having projections as in a known bearing unit, thereby reducing costs, such as machining costs, of the motor device.

According to a second aspect of the present invention, a motor device comprises a base, a bearing unit fixed to the base, a core unit including coils provided around cores to be fixed to the base side, a rotational shaft rotatably supported by the bearing unit, a rotor fixed to the rotational shaft, and a magnet fixed to the rotor and opposing the core unit. The bearing unit includes an individual flange mating with a bearing at the periphery of the bearing, the flange having a bottom surface perpendicular to the rotational shaft and an upper surface inclined with respect to the bottom surface. The core unit is placed on the inclined upper surface of the flange, whereby the core unit is disposed inclined with respect to an upper face of the base.

With this arrangement, sizing can be performed by using the periphery of the bearing as a reference before the bearing is mated with the flange, thereby enabling highly accurate sizing. Moreover, the bearing can be made with a simple straight cylindrically formed material, thereby reducing the manufacturing cost.

According to a third aspect of the present invention, a motor device comprises a base, a bearing unit fixed to the base, a core unit including coils provided around cores to be fixed to the base side, a rotational shaft rotatably supported by the bearing unit, a rotor fixed to the rotational shaft, and a magnet fixed to the rotor and opposing the core unit. The motor device further comprises a positioning member for positioning the core unit on the base, and a supporting member formed integrally with the positioning member. The core unit is disposed inclined with respect to the base by being supported by the bearing unit and an upper surface of the supporting member.

With this arrangement, sizing can be performed by using a surface perpendicular to the rotational shaft as a reference before the supporting member is provided, thereby enabling highly accurate sizing. The supporting member is designed to have a surface for supporting the core unit at a level, for example, higher than that of the bearing unit, whereby the core unit is supported inclined in a given direction.

The supporting member is preferably supported by the bearing unit at a bottom surface of the supporting member. For example, the supporting member may include a tabular protrusion protruding from a positioning member toward the bearing unit, thereby providing the supporting member with resiliency so as to be vertically deflectable, whereby the supporting member is deflected when the core unit is loaded thereon, so that the supporting member is supported by the bearing unit.

According to the present invention, by the magnetic attraction between the magnet provided on the rotor and the core unit which is fixed inclined to the bearing unit, the rotor is inclined in the same direction as the core unit, thereby tilting the rotational shaft. The rotational shaft is urged to one side of the coupling hole with which the rotational shaft is rotatably coupled, whereby decentering of the rotational shaft is prevented, thereby suppressing tracking errors.

BRIEF DESCRIPTION OF THE DRAWINGS

FIG. 11 is a perspective view of a bearing unit used in a known motor device.

DESCRIPTION OF THE PREFERRED EMBODIMENTS

FIGS. 1 to 10 show embodiments of a motor device according to the present invention. A motor device (a spindle motor) is assembled in a disk drive for a floppy disk used as a recording medium for a computer.

Figure 1:
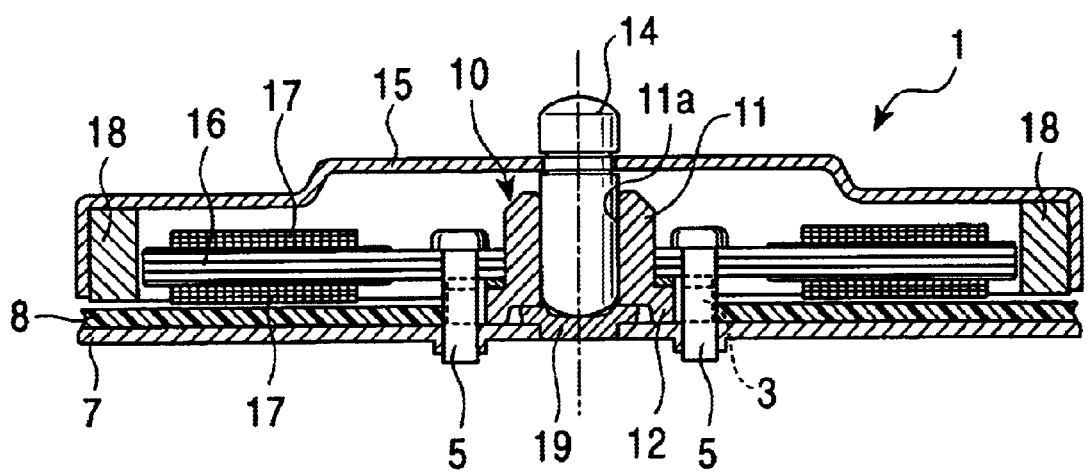
FIG. 1 is a sectional view of a motor device according to a first embodiment of the present invention.
Figure 2:
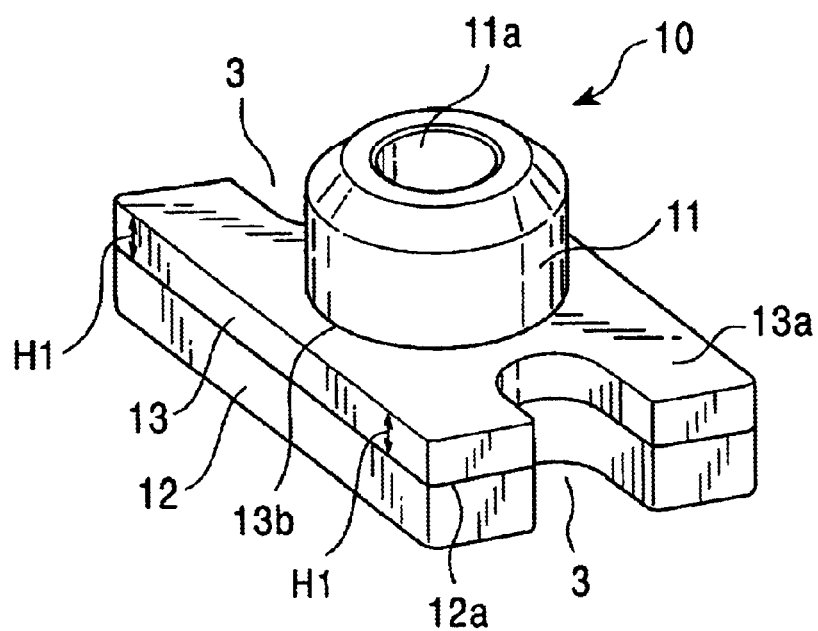
FIG. 2 is a perspective view of a bearing unit used in the motor device according to the first embodiment.
Figure 3:
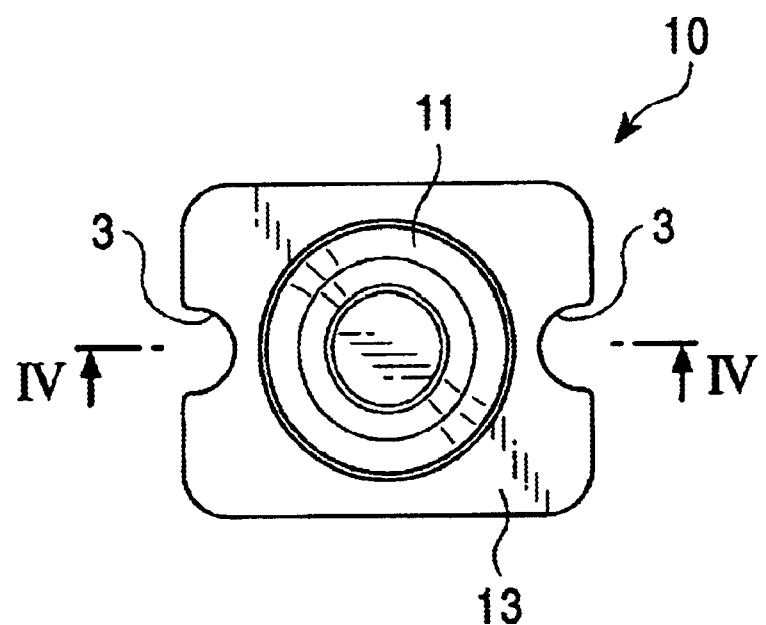
FIG. 3 is a plan view of the bearing unit shown in FIG. 2.
Figure 4:
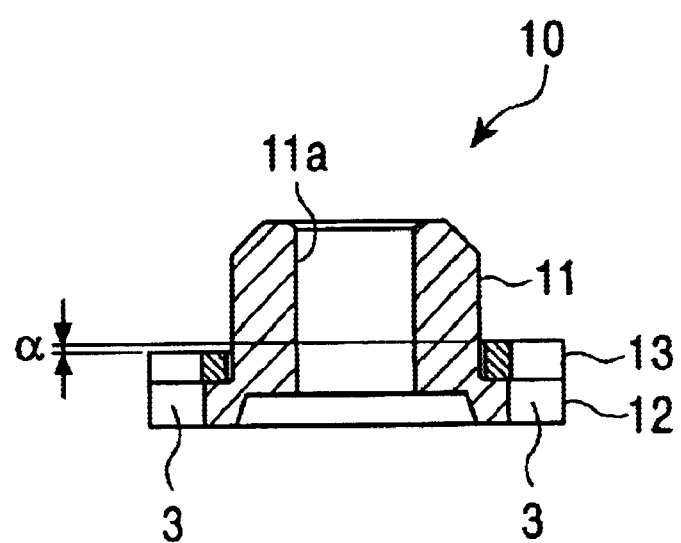
FIG. 4 is a sectional view along line IV—IV of the bearing unit shown in FIG. 3.

FIGS. 1 to 4 show a first embodiment of a motor device according to the present invention. FIG. 1 is a sectional view of the motor device. FIG. 2 is a perspective view of a bearing unit used in the motor device according to the first embodiment. FIG. 3 is a plan view of the bearing unit used in the motor device according to the first embodiment. FIG. 4 is a sectional view along line IV—IV of the bearing unit shown in FIG. 3.

A motor device 1 shown in FIG. 1 includes a base 7 made of, for example, a metallic plate, the base 7 being laminated with a printed-circuit board (PCB) 8 having predetermined electrode patterns formed on a glass epoxy substrate. The base 7 is provided thereon with a bearing unit 10 at the rotational center of the disk. A rotational shaft 14 is inserted into and is supported by the bearing unit 10. A circular rotor 15 having a shape of a downwardly-disposed tray is fixed to the rotational shaft 14, the rotor 15 being rotatable integrally with the rotational shaft 14.

The bearing unit 10 is provided with a core unit 16 including a plurality of iron cores 16b extending in the radial directions, the cores 16b included in the core unit 16 being provided with coils 17. A thrust block 19 is fixed to the base 7 at the bottom end of the rotational shaft 14. The rotational shaft 14 rotates slidingly on the thrust block 19.

The rotor 15 is fixed to the rotational shaft 14 so as to cover the core unit 16. The rotor 15 is provided with an annular magnet 18 on the inner face of the periphery of the rotor 15 and around the core unit 16. A predetermined gap is provided between the magnet 18 and ends of the cores of the core unit 16. The magnet 18 opposes the electrode patterns formed on the PCB 8 across a predetermined gap therebetween. The core unit 16 is fixed to the base 7 by screws 5, and the bearing unit 10 is fixed by being clamped by the core unit 16 and the base 7.

The rotor 15 is provided thereon with a turntable (not shown). A chucking yoke is provided on the upper surface of the turntable. When a disk (a medium) is loaded into the disk drive, the chucking yoke and a hub disposed at a center of the disk are connected with each other by a magnetic effect, thereby transmitting the driving force of a motor to the disk.

The bearing unit 10 includes, as shown in FIGS. 2 to 4, a cylindrical bearing 11 having a cylindrical inner wall and a cylindrical outer periphery and a flange 12 extending from the lower outer periphery of the cylindrical bearing 11 along the base 7 and the PCB 8, the cylindrical bearing 11 and the flange 12 being formed integrally with each other.

The bearing unit 10 including the cylindrical bearing 11 and the flange 12 is formed integrally by die-casting an alloy such as a zinc-alloy or by sintering a powdered metal. The cylindrical bearing 11 functions as a bearing impregnated with lubricating oil. The lubricating oil oozes out due to changes in air pressure when the rotational shaft 14 rotates in the cylindrical bearing 11, and returns into the cylindrical bearing 11 when the rotational shaft 14 stops rotating.

An upper face 12a of the flange 12 is formed in a plane perpendicular to the rotational shaft 14. The flange 12 is provided with U-shaped grooves 3 at the longitudinal ends thereof. The grooves 3 serve for receiving the screws 5 for screwing the core unit 16 and the base 7.

In a sizing process in manufacturing the bearing unit 10, a rod-shaped material, such as a shaft, is pressed into a coupling hole 11a of the cylindrical bearing 11 to form the coupling hole 11a accurately with a designed inner diameter. The sizing is performed, before a spacer 13 is placed on the upper face 12a, by using the upper face 12a of the flange 12 as a reference.

The spacer 13 is placed on the upper face 12a of the flange 12 after the sizing process. The outline of the spacer 13 made of a resin or a metal is the same as that of the flange 12. The spacer 13 is provided with a through hole 13b which can receive the cylindrical bearing 11. The spacer 13 is laminated on the upper face 12a of the flange 12 and fixed thereto by an adhesive or the like. As shown in FIG. 2, the spacer 13 is formed so that a thickness H2 at one of the longitudinal ends thereof is greater than a thickness H1 at the other longitudinal end. An upper face 13a of the spacer 13 is inclined with respect to a plane perpendicular to the rotational axis of the rotational shaft 14. As shown in FIG. 4, the upper face 13a is inclined at an angle α with respect to a plane perpendicular to the rotational axis of the rotational shaft 14.

The core unit (yoke) 16 of the bearing unit 10 shown in FIG. 1 is made of a magnetic metal. The core unit 16 is disposed on the upper face 13a of the spacer 13 fixed thereto in an inclined position due to the inclined upper face 13a. In this case, the rotor 15 and the rotational shaft 14 are forced to be inclined along the core unit 16 which is disposed inclined on the upper face 13a fixed thereto, thereby urging the rotational shaft 14 to one side of the coupling hole 11a of the bearing unit 10, whereby decentering of the rotational shaft 14 is prevented by the urging force.

The magnet 18 and the core unit 16 are continuously urged magnetically to each other because the core unit (yoke) 16 is made of a magnetic material, and the magnet 18 provided on the rotor 15 opposes the core unit 16 at the inner face of the magnet 18 across a minute gap therebetween. Although the inner wall of the cylindrical bearing 11 of the bearing unit 10 and the outer periphery of the rotational shaft 14 are accurately formed so that the inner diameter of the cylindrical bearing 11 and the outer diameter of the rotational shaft 14 are exactly as designed, a small gap is unavoidably formed between the rotational shaft 14 and the inner wall of the cylindrical bearing 11. Due to this gap, decentering (wow and flutter), in which the direction of inclination of the rotational shaft 14 varies, is likely to occur when the core unit 16 is not inclined, because the direction of magnetic urging between the core unit 16 and the magnet 18 occasionally changes.

When the core unit 16 disposed on the upper face 13a of the spacer 13 is disposed inclined by a predetermined angle, the rotor 15 having the magnet 18 urged toward the core unit 16 is forced to be inclined in the same direction as that of inclination of the core unit 16, whereby the rotational shaft 14 is urged to be tilted in the same direction, thereby preventing wow and flutter.

Figure 5:
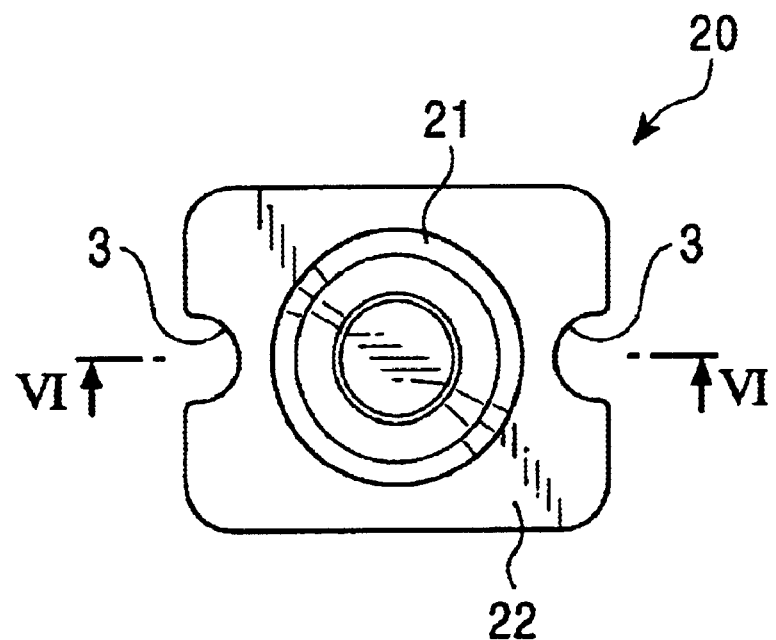
FIG. 5 is a plan view of a bearing unit used in a motor device according to a second embodiment of the present invention.
Figure 6:
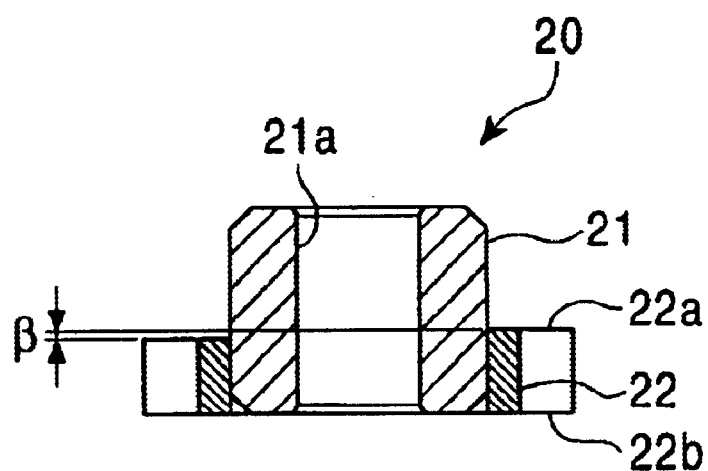
FIG. 6 is a sectional view along line VI—VI of the bearing unit shown in FIG. 5.

FIGS. 5 and 6 show a bearing unit used in a motor device according to a second embodiment of the present invention. FIG. 5 is a plan view of the bearing unit. FIG. 6 is a sectional view along line VI—VI of the bearing unit shown in FIG. 5.

A bearing unit 20 shown in FIGS. 5 and 6 has the same external shape as that of the bearing unit 10. The bearing unit 20 includes a cylindrical bearing 21 and a flange 22 formed independently and assembled with each other. The cylindrical bearing 21 is formed of a cylindrical substance made of any one of a resin, a metal, and a sintered alloy, and includes a coupling hole 21a. The cylindrical bearing 21 is preferably an oil retaining bearing in the same fashion as in the cylindrical bearing 51 used in the motor device according to the first embodiment. The flange 22 is disposed extending from the lower periphery of the cylindrical bearing 21 along the same base 7 as shown in FIG. 1. A bottom face 22b of the flange 22 is formed perpendicular to the rotational axis of the rotational shaft 14. An upper face 22a of the flange 22 is inclined by an angle β with respect to the bottom face 22b (see FIG. 6). The flange 22 is disposed around the cylindrical bearing 21 and is fixed thereto by a method such as press-fitting or bonding.

When manufacturing the bearing unit 20, a sizing process of the coupling hole 21a of the bearing 21 is performed before the flange 22 is fixed to the cylindrical bearing 21. In the sizing process, the outer periphery of the cylindrical bearing 21 is used as a reference by disposing the cylindrical bearing 21 on a given plane surface or by supporting the same at the periphery.

The bearing unit 20 is disposed at the rotational center of a disk in the same manner as in the bearing unit 10 shown in FIG. 1. A core unit 16 is placed on an upper face 22a of the flange 22 and is fixed to a base 7 by screws, whereby the bearing unit 20 is fixed to the base 7 by being clamped by the core unit 16 and the base 7.

Figure 7:
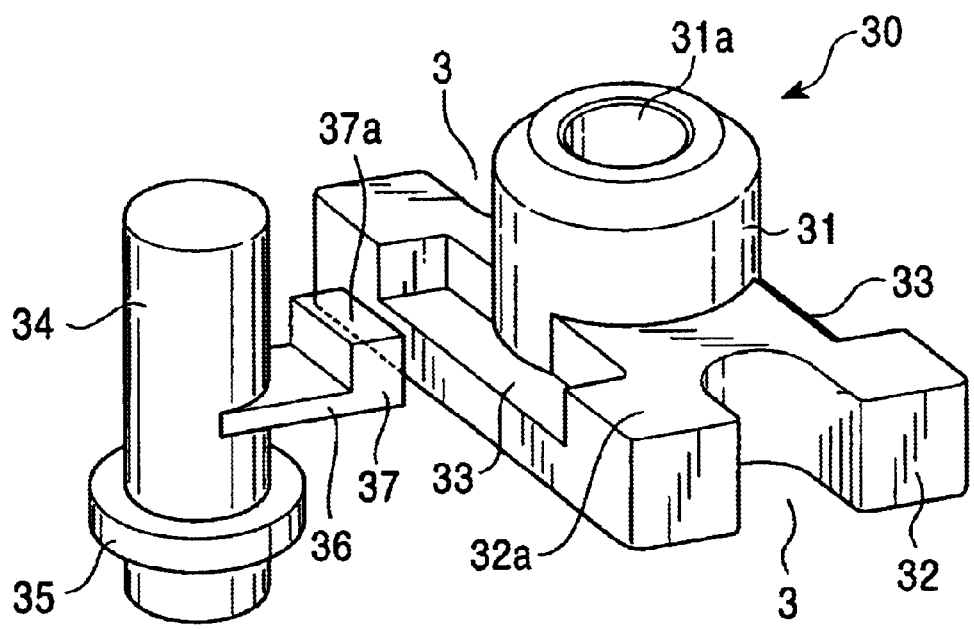
FIG. 7 is a perspective view of a bearing unit used in a motor device according to a third embodiment of the present invention.
Figure 8:
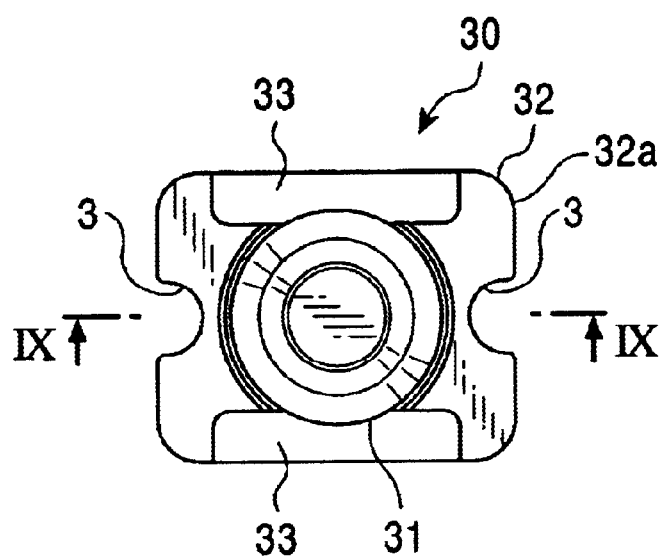
FIG. 8 is a plan view of the bearing unit shown in FIG. 7.
Figure 9:
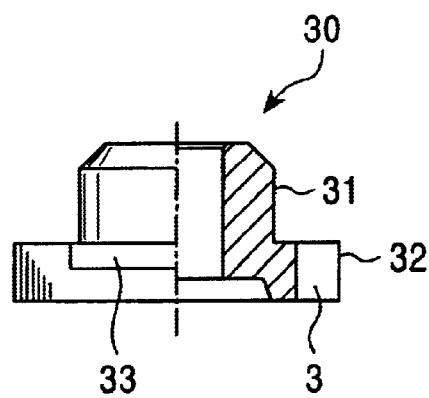
FIG. 9 is an illustration of the bearing unit shown in FIG. 8, a critical portion thereof being shown in section along line IX—IX.
Figure 10:
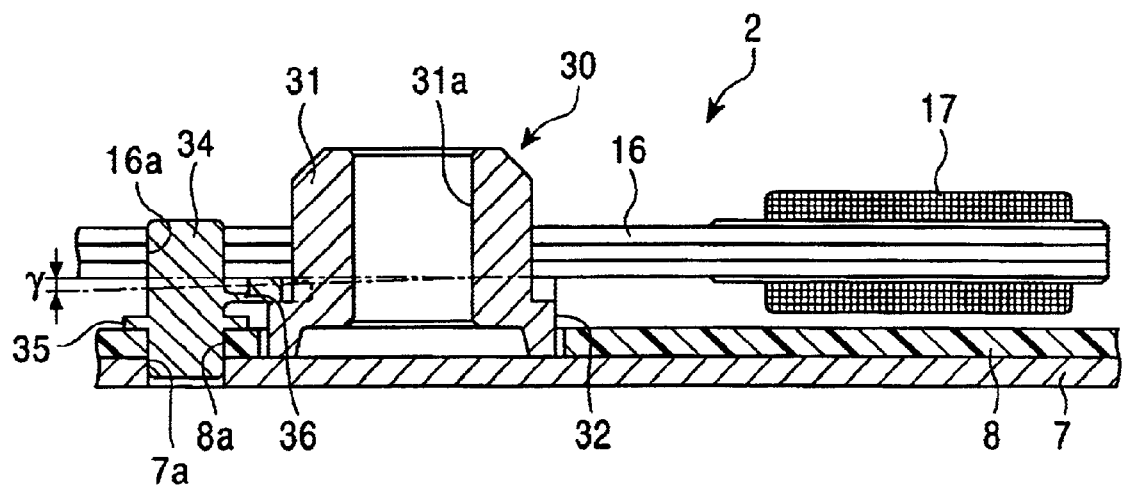
FIG. 10 is a sectional view of a critical portion of the motor device according to the third embodiment of the present invention provided with the bearing unit.

FIGS. 7 to 10 show a bearing unit used in a motor device 2 according to a third embodiment of the present invention. FIG. 7 is a perspective view of the bearing unit. FIG. 8 is a plan view of the same. FIG. 9 is an illustration of the bearing unit shown in FIG. 8, a critical portion thereof being shown in section along line IX—IX. FIG. 10 is a sectional view of a critical portion of the motor device 2.

A bearing unit 30 shown in FIGS. 7 to 9 includes a cylindrical bearing 31 formed of a cylindrical substance and includes a coupling hole 31a. A flange 32 is disposed around the lower periphery of the cylindrical bearing 31 extending along a base (not shown). The cylindrical bearing 31 and the flange 32 made of a sintered alloy or the like being formed integrally with each other in the same fashion as in the bearing unit 10. U-shaped grooves 3 shown in the drawings have the same shape and function as those of the bearing units 10 and 20.

The flange 32 is provided with steps 33 formed by cutting away the upper edges of the longitudinal sides of the flange 32, each step 33 being disposed symmetrically at the longitudinal sides of the flange 32. An upper face 32a of the flange 32 is perpendicular to a coupling hole 31a of the cylindrical bearing 31. Sizing of the bearing unit 30 is performed while the bearing unit 30 is in a state shown in FIGS. 8 and 9. In this case, the sizing is performed with the upper face 32a of the flange 32 being a reference.

The core unit 16 and a POB 8 must be positioned in relation to a Hall element (not shown). Hall elements are typically formed in the shape of a thin plate by a material having a large Hall constant and a small temperature dependency, such as germanium, and are used for performing measurements or calculations by utilizing the Hall effect. Therefore, a positioning member 34 is used for positioning, as shown in FIG. 10. The cylindrical positioning member 34 is made of a resin or metal, and is provided with a collar 35 formed integrally with the position member 34.

As shown in FIG. 10, the positioning member 34 passes through a hole 16a formed in the core unit 16, another hole 7a formed in the base 7, and another hole 8a formed in the PCB 8, thereby positioning the core unit 16 and the PCB 8. In this case, the collar 35 comes into contact with an upper face of the PCB 8, thereby restricting further downward movement of the positioning member 34.

The positioning member 34 is also provided with a supporting member 36 at the periphery thereof and above the collar 35 protruding toward the cylindrical bearing 31. As shown in FIG. 7, the supporting member 36 includes a tabular base end and a rectangular block 37 at the other end of the supporting member 36, the rectangular block 37 extending upwardly so as to have a thickness greater than the tabular base end. The rectangular block 37 is formed integrally with the supporting member 36. The supporting member 36 has the same width as the length of the step 33 or less so as to be received by the step 33, and protrudes sufficiently for the bottom face of the supporting member 36 to make contact with the bottom face of the step 33. The supporting member 36 is preferably positioned so that the bottom face of the supporting member 36 is disposed at the same level as that of the bottom face of the step 33 or slightly higher. The bottom face of the supporting member 36 may be positioned lower than the bottom face of the step 33 provided that the bottom face of the supporting member 36 can be brought into contact with the bottom face of the step 33. The block 37 is formed so that an upper face 37a of the block 37 is positioned higher than the upper face 32a of the flange 32 when the supporting member 36 is placed on the step 33.

The positioning member 34, the collar 35, and the supporting member 36 are integrally formed with a resin. However, these components may be independently made of individual materials.

The core unit 16 positioned in the bearing unit 30 as described above is fixed to the bearing unit 30 so as to be inclined by an angle γ with respect to a line perpendicular to the rotational axis (not shown), as shown in FIG. 10. The core unit 16 is inclined to be supported by three points, namely, two points of the flange 32 and one point of the supporting member 36.

According to the above-described three embodiments, the core unit 16 is supported inclined when the bearing unit 10, 20, or 30, respectively, is mounted on the motor device according to the present invention, whereby the rotational shaft 14 and the rotor 15 are inclined (as shown with respect to the first embodiment), thereby urging the rotational shaft 14 to one side of the coupling hole 11a, 21a, or 31a, respectively. With this arrangement, decentering of the rotational shaft 14 is prevented, whereby an accurate on-tracking control is possible, thereby preventing tracking errors.

The motor device according to the present invention is not limited to those described in the embodiments. In the bearing unit 10 included in the motor device described in the first embodiment, the spacer 13 may be provided with projections at one side thereof instead of being provided with the inclined upper face 13a, or the base 7 or the PCB 8 may be provided with projections for supporting the core unit 16 in an inclined state instead of providing the spacer 13.

According to the present invention described above, a motor device is obtainable in which an accurate sizing is possible, thereby ensuring on-tracking accuracy in disk accessing and preventing tracking errors. The motor device can be manufactured at low cost.

What is claimed is:

1. A motor device comprising:

a base;

a bearing unit fixed on the base;

a core unit including a plurality of cores which extend in a radial direction from the bearing unit along an upper surface of the base and coils provided around each of the plurality of cores, the core unit integrally forming the plurality of cores;

a rotational shaft having two ends, one end of the rotational shaft rotatably supported by the bearing unit;

a rotor fixed to the other end of the rotational shaft; and a magnet fixed to the rotor and opposing the core unit, wherein the bearing unit includes a shaft supporter having a cylindrical shape which rotatably supports the rotational shaft, a flange formed integrally with the shaft supporter, extending along the upper surface of the base, and having an approximately uniform thickness, and a spacer disposed on the flange and having an inclined surface that is inclined with respect to the upper surface of the base, and wherein the core unit is disposed on the inclined surface of the spacer, whereby the core unit is supported by the inclined surface such that the core unit is inclined with respect to the upper surface of the base.

2. A motor device comprising:

a base;

a bearing unit fixed on the base;

a core unit including a plurality of cores which extend in a radial direction from the bearing unit along an upper surface of the base and coils provided around each of the plurality of cores, the core unit integrally forming the plurality of cores;

a rotational shaft having two ends, one end of the rotational shaft rotatably supported by the bearing unit;

a rotor fixed to the other end of the rotational shaft; and a magnet fixed to the rotor and opposing the core unit, wherein the bearing unit includes an individual flange attached to a bearing at the periphery thereof, the flange having a bottom surface forming a surface perpendicular to an axis of the rotational shaft and an upper surface inclined with respect to the bottom surface and to the upper surface of the base, the flange is provided with a concavity, and a supporting member is disposed on a bottom surface of the concavity in the bearing unit and is supported by the flange, and wherein the core unit is disposed on the inclined upper surface of the flange, whereby the core unit is supported and inclined with respect to an upper face of the base.

3. A motor device comprising:

a base;

a bearing unit fixed on the base;

a core unit including a plurality of cores which extend in a radial direction from the bearing unit along an upper surface of the base and coils provided around each of the plurality of cores, the core unit integrally forming the plurality of cores; a rotational shaft having two ends, one end of the rotational shaft rotatably supported by the bearing unit;

a rotor fixed to the other end of the rotational shaft; and a magnet fixed to the rotor and opposing the core unit, a positioning member fixed on the base to position the core unit on the base, and a supporting member formed integrally with the positioning member and extending along the upper surface of the base, wherein the bearing unit includes a shaft supporter having a cylindrical shape which rotatably supports the rotational shaft, and a flange extending from the shaft supporter along the upper surface of the base and having an approximately uniform thickness, wherein an upper surface of the supporting member is formed at a position higher than an upper surface of the flange with respect to the upper surface of the base, and wherein the core unit is supported by the upper surface of the flange and the upper surface of the supporting member such that the core unit is inclined with respect to the upper surface of the base by being disposed on the upper surface of the flange and the upper surface of the supporting member.

4. A motor device according to claim 3, wherein the flange is provided with a concavity, and wherein the supporting member is disposed on a bottom surface of the concavity in the bearing unit and is supported by the flange.

5. A motor device according to claim 3, wherein the positioning member is inserted through a hole formed in the core unit, and positions the core unit at a predetermined position above the base.

6. A motor device according to claim 5, wherein the positioning member is provided with a collar formed integrally with the positioning member and extending independently of the supporting member along the upper face of the base, and wherein the positioning member is inserted through the hole in the core unit and through a hole formed in the base and is fixed to the base, the collar being restrained by the base.

7. A motor device according to claim 1, wherein the shaft supporter and the flange are formed from a die-cast zinc alloy.

8. A motor device according to claim 1, wherein the shaft supporter and the flange are formed from a sintered metallic powder.

9. A motor device according to claim 2, wherein the bearing is formed by any one of materials selected from resin, metal, and sintered metal.

* * * * *